July 6, 1943.  A. NEWMAN  2,323,411
CONTROL MECHANISM
Filed Jan. 21, 1942  3 Sheets-Sheet 2
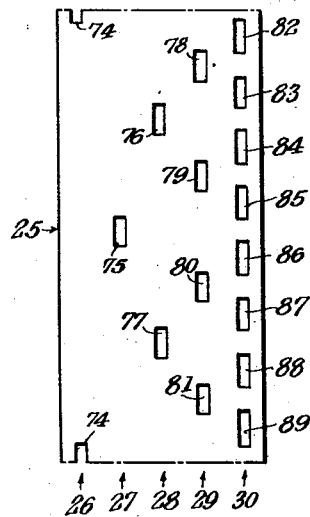
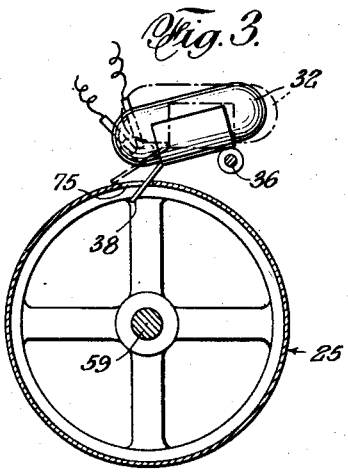
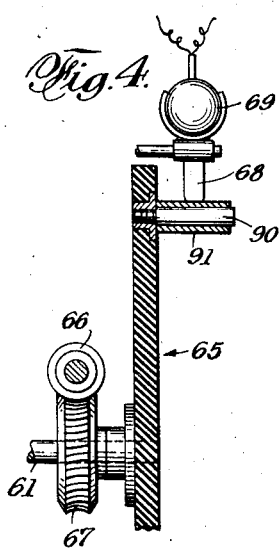
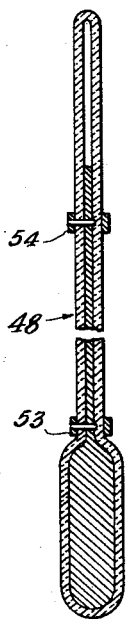
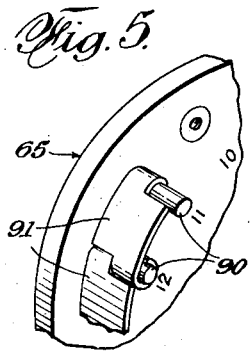
INVENTOR
ARTHUR NEWMAN
BY
ATTORNEY July 6, 1943.    A. NEWMAN    2,323,411
CONTROL MECHANISM
Filed Jan. 21, 1942    3 Sheets-Sheet 3
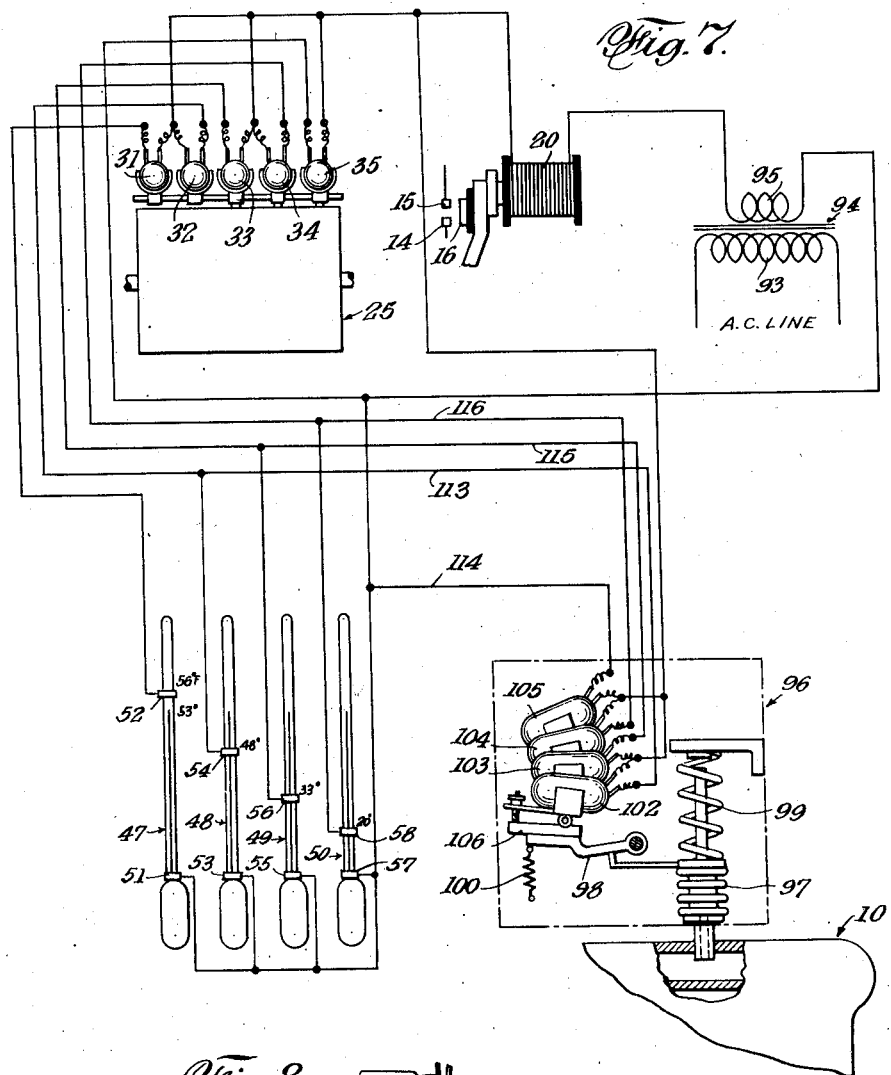
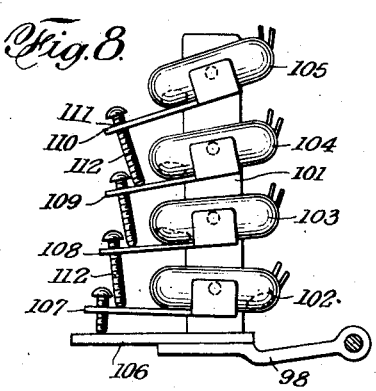
INVENTOR
ARTHUR NEWMAN
BY 
ATTORNEY & nbsp;

UNITED STATES PATENT OFFICE 2,323,411

CONTROL MECHANISM

Arthur Newman, New York, N. Y.

Application January 21, 1942, Serial No. 427,531

8 Claims. (Cl. 236—46)

This invention relates to a control mechanism, particularly although not exclusively adapted for use in conjunction with systems for the heating of buildings.

In steam heating systems it is generally regarded as most expedient to predetermine the amount of steam pressure required to provide sufficient heat for a particular building and for the specific locality in which it is situated. If no control mechanism whatsoever is employed, the pressure will be built up to the required level, and maintained there while the furnace is in operation regardless of outside temperature conditions. This obviously would provide proper heat only at certain times, while at other times there would be either too much or too little heat.

For more efficient operation, various types of controls are employed, primarily associated with pressure-actuated means for controlling the amount of heat supplied to the building. Conventional controls for this purpose generally employ a pressure switch, frequently of the rockable mercury type, whereby under certain conditions the switch is actuated to alternately shut off or turn on the supply of fuel to the furnace. Such a type of switch is usually employed in conjunction with oil burner installations. When the steam pressure exceeds a certain level, in accordance with a setting for predetermined temperatures, the switch will automatically open the circuit through the burner motor, and thereby shut off the burner, whereupon the pressure will decrease to ultimately produce a lowering of the temperature within the building. It is obvious that this type of control does not fully take into consideration temperature differences between the inside and the outside of the building, nor the rate of heat loss from the building, which is proportionate to the temperature difference.

The aforesaid failure to take into consideration the rate of heat loss is characteristic of the conventional thermostat control system which automatically shuts off the burner when the temperature in a particular room and at the point thereof where the device is situated exceeds a predetermined level. When this level is reached and the burner discontinued, the building will begin to cool, the rate of heat loss being dependent upon the difference between inside and outside temperatures. If the heat loss proceeds at a rapid rate because of low outside temperature conditions, it might take a considerable time to reheat the house. And when the burner is set into operation by this form of control, it is continuously kept in operation so as to maintain sufficient pressure to produce the required temperature conditions at the locale of the thermostat. The burner may continue operating continuously, even though the insulating properties of the building may be sufficient to keep the building warm for certain periods of time even with the burner off.

It is primarily within the contemplation of my invention to eliminate the aforesaid shortcomings in the operation of control systems for heating plants. I accomplish my objective, in one form of my invention, by providing a method of permitting the pressure in a steam boiler to attain a certain predetermined value, thereafter maintaining the pressure at substantially that level by an intermittent operation of the burner, depending upon outside temperature conditions. More specifically, my system permits burner "off" periods of variable duration depending upon the temperature prevailing outside the building. In other words, for low outside temperatures (when there is a comparatively great difference in temperature between the inside and outside of the building), "off" periods are relatively short, the "on" periods in a given time being relatively frequent. With higher outside temperatures, the duration of the off periods become longer, with less frequent on periods. My invention hence takes into full consideration the rate of heat loss through the building, which, as aforesaid, is to a large measure dependent upon the temperature differential between the inside and the outside of the building. If the rate of heat loss is low, the building will retain its heat longer than if the loss were greater; and under such conditions the steam pressure will not drop as rapidly, so that there will be no need of having the burner turned on as frequently as would be the case under lower outside temperature conditions. With the system of my invention, the burner would automatically be operated at comparatively infrequent intervals under the last-mentioned conditions.

It is hence an important object of my invention, particularly in connection with the aspect thereof above mentioned, to reduce to a minimum the period of operation of a burner while providing sufficient pressure, and consequently sufficient heat, for the building,—thereby providing an efficient and economical heating system.

It is another object of my invention to enable an adequate control to be maintained under any and all temperature and pressure conditions.

It is within the further contemplation of my invention, in one form thereof, to effectuate variations in steam pressure in accordance with outside temperature conditions.

A further object of this invention is to enable it to be constructed, installed and operated at a minimum of cost and effort.

Other objects, features and advantages will appear from the drawings and the description hereinafter given.

Referring to the drawings,

Figure 2 is a development of the drum of Figure 1, showing the slot arrangement therein.

Figure 3 is an end view of the drum and one of the mercury tube switches associated therewith.

Figure 4 is a fragmentary section of the dial member of Figure 1 taken along line 4—4 with the mercury switch in its raised or open position.

Figure 5 is a fragmentary perspective of a portion of the dial member.

Figure 6 is a vertical section of the thermometer switch employed in my invention.

Figure 7 is a diagrammatic view of a modification of my invention with a variable pressure arrangement, and Figure 8 is an elevation of the multiple tube pressure control device employable in one form of my invention.

Figure 1:
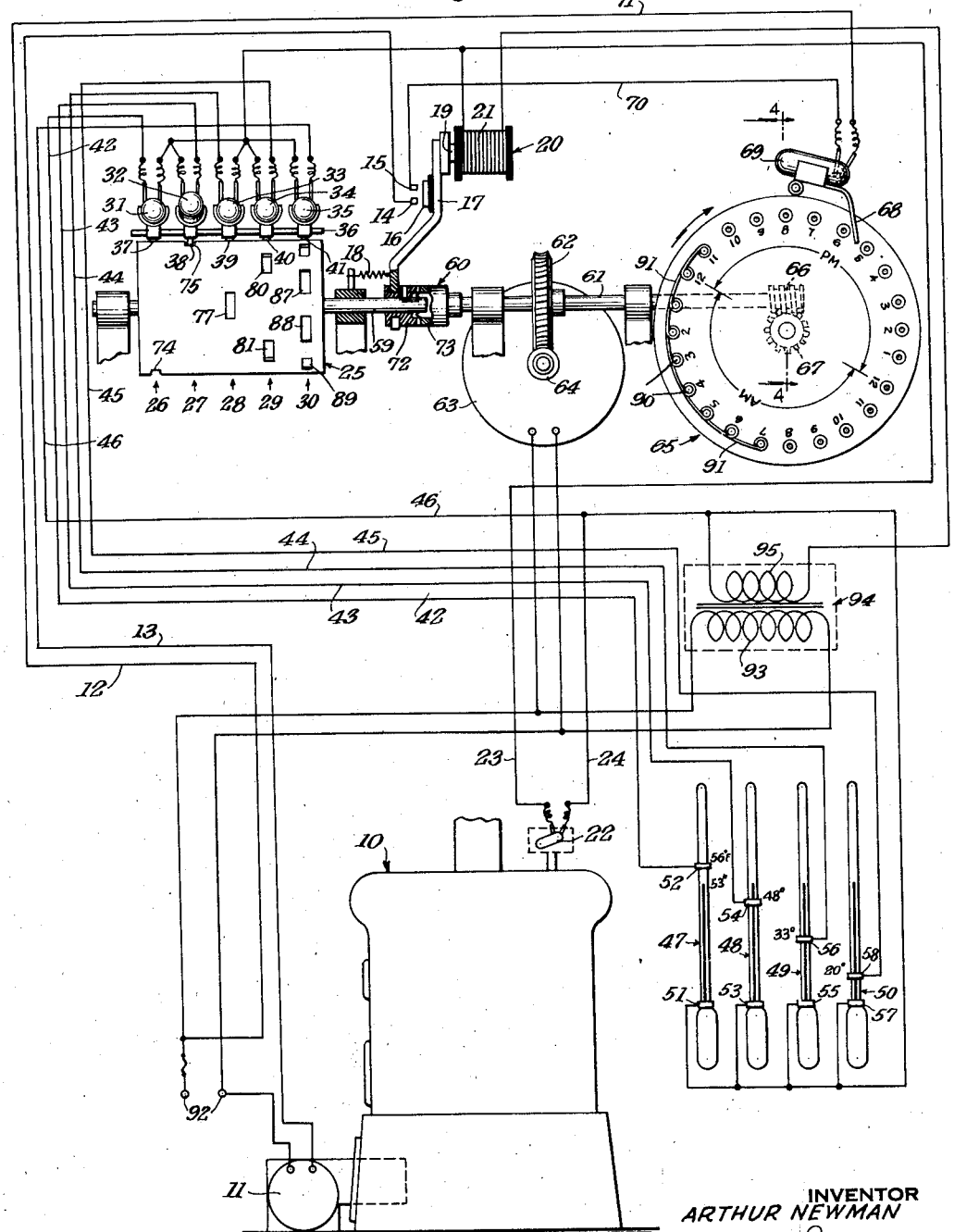
Figure 1 is a diagrammatic representation of one form of my invention as applied to a pressure controlled steam heating system.

The drawings illustrate a form of my invention as applied to a steam heating system including a steam boiler 10 fired by an oil burner operated by the motor 11 in the main circuit indicated by lines 12 and 13. This circuit contains therein the burner control terminals 14 and 15 which are adapted to be bridged or electrically connected by the blade or switch element 16 carried by the armature 17. This armature is cooperatively associated with the spring 18 and the core 19 of the solenoid 20, the coil 21 of which is electrically associated with certain circuits containing circuit-closing and interrupting means to be later described. Suffice it is at this point to state that when the solenoid is energized the armature is drawn to the core against the action of said spring, and the circuit at burner terminals 14 and 15 broken, thereby stopping the motor 11 and discontinuing the oil feed to the boiler.

The boiler is also provided with a pressure control switch, the particular form illustrated being the rocker mercury switch 22. This switch is in series with the solenoid coil 21 through the conductors 23 and 24. Under normal conditions, the switch is in the open or inoperative condition; but when the pressure within boiler 10 exceeds a predetermined level, the switch 22, by a conventional mechanical mechanism, is rocked into its closed position, to close the circuit through coil 21, thereby energizing the solenoid, drawing the armature 17 to the core, and consequently opening the burner circuit. The particular construction of the boiler pressure means to actuate mercury switch 22 will not herein be described, inasmuch as it is of a conventional construction well known in the art.

From the above it is thus apparent that the burner firing the boiler can be turned on and off by the operation of the solenoid 20, and said solenoid being operable by the pressure switch 22 and by certain other means to be hereinafter set forth.

In accordance with one of the prime objects of my invention, it is desired to effect an intermittent operation of the burner in accordance with outside temperature conditions. To accomplish my preferred way of attaining this objective, I employ as movable means a rotatable drum 25 containing thereon means to actuate certain control switches which in turn are adapted to effect the intermittent actuation of switch element 16, or any other movable member or control means for starting and stopping the fuel supply. Each of said control switches is connected in a circuit including the coil 21 of the solenoid 20, and suitable circuit-breaking means. In the preferred form of my invention, the circuit-breaking means consist of automatic temperature switches, or switches adapted to be actuated under certain temperature conditions. It is, however, to be understood that in place of such automatic circuit-breaking means, manual means may be employed with equal force and effect.

Specifically, the drum 25 contains a number of slots in the surface thereof, each of these slots being adapted to receive therein an arm of a control switch, preferably a rockable mercury switch, for the purpose of permitting the switch to move into its closed position when the arm drops into the slot. Although slots or openings are illustrated in the drawing, it is of course understood that elevations or other switch-actuating means can be employed with the same effect, within the scope of this invention. In the design illustrated, there are five groups of slots arranged in five rows, 26, 27, 28, 29 and 30, the slots in each row being movable substantially in a plane perpendicular to the axis of rotation. Disposed above this cylinder and cooperable with said rows of slots are the mercury control switches 31, 32, 33, 34 and 35. All the said switches are rockably mounted at 36, in conventional manner, and contain the arms 37, 38, 39, 40 and 41 adapted to be operatively received by the slots in rows 26, 27, 28, 29 and 30, respectively. Normally, that is, when the switch arms rest upon the surface of the cylinder, the switches are in their open or inoperative conditions, but when the arms are within their corresponding slots, the switches will have been rocked into their closed positions. It will be further observed that each one of the said switches is independently electrically connected to the coil 21 of the solenoid, the switches 31, 32, 33, 34 and 35 being parts of circuits containing the lines 42, 43, 44, 45 and 46, respectively. If, then, any of the mercury switch arms is within one of its coacting slots, the solenoid will be energized,—provided, of course, there is no break in the circuit.

My invention, however, does deliberately provide for breaks in certain of the mercury switch circuits last referred to,—such breaks being effectuated by outside thermometer switches 47, 48, 49 and 50. These thermometer switches, in the preferred form thereof, consist of conventional thermometers, each being provided with two electric terminals, one in the vicinity of the base of the mercury column, and the other at a predetermined point above. For purposes of illustration, thermometer 47 contains base terminal 51 and upper terminal 52 set at 56° Fahr.; thermometer 48 contains base terminal 53 and upper terminal 54 set at 48° Fahr.; thermometer 49 contains base terminal 55 and upper terminal 56 set at 33° Fahr.; and thermometer 50 contains base terminal 57 and upper terminal 58 set at 20° Fahr. The terminals of thermometer 47 are in series with switch 31, the terminals of thermometer 48 are in series with mercury switch 32, the terminals of thermometer 49 are in series with mercury switch 33, and the terminals of thermometer 50 are in series with mercury switch 34.

If the outside temperature is below 56°, the electrical connection between terminals 51 and 52 of thermometer 47 will be broken, but otherwise the mercury column will bridge said terminals and close the circuit. Similarly, each set of terminals for each of the thermometers will be opened and closed depending upon the outside temperature. The manner in which these thermometer switches serve to control the operation of the oil burner will be described later in this specification.

The drum 25 is mounted on shaft 59 which, by means of coupling unit 60 is engageable with shaft 61 upon which is fixed the gear wheel 62. This gear is operatively connected to the time clock motor 63 through the worm 64. The time clock shaft 61 is connected to the twenty-four hour dial 65 through the gears 66 and 67.

This dial is in continuous operation throughout the twenty-four hours of the day through the continuous action of motor 63. The dial is provided with means, to be later described, adapted during certain periods of the day to engage the arm 68 of time-clock mercury switch 69. During such engagement the switch is elevated whereby it is brought into open or inoperative position. When the said mercury switch 69 is in its normal or lowered position, it is in closed condition, thereby closing the circuit through lines 70 and 71, and through burner terminals 14 and 15, to permit the burner motor 11 to be actuated when any of the circuits operatively associated therewith are closed. But when the said time clock switch 69 is in its open position, the circuit through motor 11 can under no circumstances be completely closed regardless of the open or closed positions of the other circuits in the apparatus of my invention. It is thus apparent that only when the dial 65 is set for operation during a certain period of time will the control mechanism be in a position to serve its intended function. For example, if it is desired to keep the furnace out of operation during certain hours of the night, a proper setting of this dial will open mercury switch 69 during such time, and keep the burner motor 11 out of operation, as will more clearly hereinafter appear.

The aforesaid coupling unit 60 contains a slidable member 72 associated with shaft 59, said slidable member being connected to armature 17. The arrangement is such that when the armature is attracted to core 19 upon an energizing of the solenoid, member 72 of the coupling will operatively engage member 73, thereby operatively uniting shafts 59 and 61.

From the above it is apparent that whenever solenoid 20 is energized, the drum 25 will be operatively connected to the time-clock motor 63 and will be rotated thereby. At the same time, that is, when the drum is in rotation, the oil burner terminals 14 and 15 will be electrically disconnected, so that the burner is at such time in its off condition.

The slots in the drum are so arranged, in the preferred form of my invention illustrated, that an arm of at least one of the mercury switches thereabove is at all times disposed within a slot. In other words, regardless of the position of the drum, there is always one switch arm in one of the slots. This is made possible by the spacing of these slots which is clearly illustrated in the development of the cylindrical surface of the drum, as shown in Figure 2. It will be observed that in row 26, there is a single slot 74 at a predetermined location (shown split in the development). In the next row 27, the slot 75 is 180° removed therefrom,—regarding the circumferential extent of the drum as being 360°. In row 28, there are two slots 76 and 77 in staggered relation with respect to slots 74 and 75. In other words, slot 76 is 90° from slot 74, and slot 77 is 90° from slot 75. In the next row 29 there are four equally spaced slots 78, 79, 80 and 81, the first one, that is slot 78, being 45° from slot 74 in row 26. And in the last row 30, there are eight slots 82, 83, 84, 85, 86, 87, 88 and 89,—the first one 82 being 22½° from slot 74 in row 26.

From the above arrangement it will be noted that during one complete revolution of the drum, the order of entry of the various mercury switch arms into the slots is as follows, the numerals indicating the switch arms in their order of entry into coacting slots during one complete revolution of the drum: 37—41—40—41—39—41—40—41—38—41—40—41—39—41—40—41.

In the particular form of my invention illustrated, the arrangement is such that the drum makes one revolution in every 120 minutes. The length of each of the slots is designed to be such that it will take five minutes for each slot to pass a given point during the operative revolution of the drum. Hence with this arrangement, for every complete revolution of the drum, arm 37 of switch 31 will be within slot 74 for a total of five minutes of revolution, and will be resting on the surface of the cylinder for a total of 115 minutes. In other words, mercury switch 31 will be closed for the said five minutes and open for the remaining 115 minutes. Hence, if the entire circuit of which mercury switch 31 is a part is closed, the solenoid 20 will be energized by said switch for a maximum total time of only five minutes, and de-energized for 115 minutes; and the burner will therefore be on for only five minutes during the two hour period,—unless low pressure conditions in the boiler will, in cooperation with pressure switch 22, cause a switching on of the burner, as will more fully hereinafter appear.

If mercury switch arms 37 and 38 are considered together, there will be, under similar closed circuit conditions, two 5 minute periods of operation of the burner during a two hour period. If mercury switches 37, 38 and 39 are considered together, there will be four 5 minute periods of operation of the burner, or a total of twenty minutes, with 100 minutes as off intervals. And if mercury switch arms 37, 38, 39 and 40 are considered together, there will be eight five minute periods, and off periods aggregating 80 minutes during one complete revolution of the drum. It thus appears that the total number of on and off periods can be cumulative depending upon the operation of the thermometer switches, as will hereinafter appear.

It is important to note that the length of the slots in row 30, and their positioning, is such that they extend over all off periods with respect to rows 26, 27, 28 and 29. In other words, at such times when all the arms 37, 38, 39 and 40 are out of the slots, the mercury switch arm 41 will be in one of the slots of row 30.

In order to more fully understand the operation of this system, let us consider the situation where the outside temperature is 60° Fahr. This temperature is above the highest temperature set on thermometer 47, or on any of the other thermometers. Hence, the mercury columns in all of the thermometers will close the circuits across the thermometer terminals. Under such conditions, when arm 37 of mercury switch 31 enters the slot 74, the mercury switch will drop and the circuit therethrough will close. This will close the circuit through the solenoid, whereupon the armature 17 will be drawn to the right to break the connection between burner terminals 14 and 15, thereby stopping the operation of the burner. At the same time, the armature has coupled together the shafts 59 and 61, and thereby set the drum into operation. This entire operation merely indicates that when the outside temperature is high, the burner will be shut off inasmuch as no heat is required.

Now let us consider a drop in outside temperature to 53° Fahr., as indicated in Figure 1. This will effect an opening of the circuit in the thermometer 47, whereas the circuits through the other thermometers will remain closed. When the arm 37 enters slot 74, there will be no action whatsoever on the solenoid, for although the mercury switch 31 was closed, the circuit connecting this switch with the solenoid was broken because of the open condition of the thermometer switch 47. Hence, while the switch arm 37 is within slot 74, the armature 17 remains to the left and the circuit across the burner terminals 14 and 15 is closed. The burner will then be in operation, thereby building up a steam pressure so as to supply heat to the building. It should in the meantime be observed that the drum 25 is stationary, in view of the fact that with the armature to the left, shafts 59 and 61 are uncoupled.

The burner will remain on as long as it is necessary to enable the system to attain the required pressure. It should be borne in mind that pressure switch 22 is in its lowered or open position when the pressure within the boiler is low. It is only when the pressure is built up to the required level, according to the setting of the pressure switch 22, that this switch will be operatively actuated and the circuit therethrough closed. When this occurs, the solenoid will become energized, and the armature 17 will be drawn to the right to break the connection at terminals 14 and 15, and stop the burner. At the same time the complementary members of the coupling will become engaged and the drum 25 started into rotation. If the pressure should thereafter drop down again below the preset figure while switch arm 37 is still within the slot, the pressure switch will drop to its normal open position and thereby break the circuit through the solenoid. This will cause the armature to be carried to the left to again bridge burner terminals 14 and 15, thereby starting the burner into operation again. The burner continues to operate until the pressure is built up to again actuate the pressure switch, energize the solenoid and thereby shut off the burner and start the drum rotating once again. This operation continues until the switch arm 37 has become disengaged from the slot, whereupon the mercury switch 31 is elevated and the circuit through the solenoid broken.

Thus it is, in the case above considered, that only during the time that the switch arm 37 is within slot 74 can the pressure be brought up to the predetermined level. When the pressure has attained the required level with the pressure switch 22 raised to its closed position and the solenoid accordingly energized, the drum will be caused to rotate with the mercury switch arm 37 within the slot. And while said arm is within the slot, the system is guaranteed five minutes of pressure at the predetermined level. Should the pressure drop below that level while the arm 37 is still within the slot, the drum will stop rotating while the pressure is being built up to the said predetermined level. In other words, the condition of the circuit while the mercury switch arm 37 is within the slot is such as to give assurance that the pressure switch will be in its raised or closed position for at least one continuous five minute period, or a number of shorter periods aggregating a total of five minutes.

After the completion of the said five minute period, when switch arm 37 leaves the slot 74 (with the outside temperature still at 53°), the drum will continue rotating because of the fact that the circuit through the solenoid is closed inasmuch as there is always one switch arm within one of the slots. That is, the closed conditions of mercury switches 31, 32, 33 and 34, together with the action of mercury switch arm 41, will keep the drum in rotation. The burner will thus be shut off for a period of 115 minutes, permitting the pressure to decrease. In this connection it should be noted that under the said outside temperature conditions, the rate of heat loss from the building is not very great, and the building will thus be maintained in a sufficiently warm condition by virtue of its insulating properties. However, upon the completion of one cycle of rotation of the drum, the burner will again be set into operation to bring the pressure up to the required level.

If the outside temperature should now drop to 45° Fahr., it is obvious that a longer period of burner operation will be required. This is effected by two periods each of a continuous or interrupted five minute operating time. At such outside temperature, the circuits through thermometers 47 and 48 will both be broken, so that during a single rotation of the drum, mercury switch arms 37 and 38 will, during their engagement with their respective slots, cause the pressure to remain at the predetermined level for a total of ten minutes.

Similarly, when the outside temperature is lowered to say 28° Fahr., the circuits in thermometers 47, 48 and 49 will be opened to cause a total of four effective switch arm slot engagements during each revolution of the drum,—the effective switch arms being 37, 38 and 39. Likewise, when the temperature reaches say 15° Fahr., the circuits through all four thermometers will be broken, to produce eight effective slot engagements of the four switch arms 37, 38, 39 and 40.

From the above it is apparent that a plurality of temperature-responsive switches, set for predetermined ranges in accordance with outside temperature conditions, will automatically control the number of times the burner is set into operation during a given period of time,—and will also control the duration of the off periods. In other words, the temperature differential between the inside and the outside of the building can, by virtue of this apparatus, be made to control the on and off periods of the burner. And it will also be observed that this control is obtained by employing a number of normally closed circuits operatively connected to a single solenoid which in turn is electrically connected both to the burner and to a control directly on the furnace, such as a pressure switch.

The above-described apparatus is operatively associated with the twenty-four hour dial 65 above referred-to, and with a suitable electric circuit, of conventional nature and design, as will be more specifically set forth.

The dial 65 is provided with a plurality of pins 90 upon which can be mounted lift plates 91, as indicated in Figures 4 and 5. For example, should it be desired to disconnect the entire apparatus between the hours of 11 P. M. and 7 A. M., a successive series of such plates are placed upon the pins. When, during the rotation of the dial, the plate 91 at the 11 P. M. position engages the arm 68 of the dial mercury switch 69, this switch will be rocked to break the circuit therethrough. Inasmuch as this switch is in series with the burner terminals 14 and 15 and the motor 11, the opening of this circuit will prevent the burner from being set into operation regardless of the condition of the other circuits of my system. It is only when the last plate at 7 A. M. leaves the switch arm 68 that the apparatus will be permitted to function again in accordance with the condition of the control circuits. The switch arm 68, being out of engagement with the lift plates, will permit the mercury switch 69 to drop to its normal closed position, thereby permitting the circuit through the motor to be closed when all other control circuits are closed.

For best operative results, it is preferred that the clock motor 63 be directly connected with the outside line 92 to which the main circuit or primary 93 of the transformer 94 is electrically connected. The solenoid, the mercury switches 31, 32, 33, 34 and 35, the pressure switch 22 and the thermometer switches 47, 48, 49 and 50 are operated by stepped down voltage through the control circuit or secondary 95 of the transformer.

The above described form of my invention is adapted for use with a pressure switch, such as the switch 22, set at a fixed and invariable pressure. Another form of my invention, however, employs an arrangement for varying the pressure in accordance with outside temperature conditions. This is effected in connection with the general system above described, and serves to add to the sensitivity and effectiveness of my invention.

By referring to Figures 7 and 8 it will be seen that, instead of a fixed pressure mercury switch, I employ the unit 96 containing therein a pressure sensitive device such as the expansible member 97 operatively connected to the furnace boiler and to lever 98. As the pressure increases, member 97 will expand upwardly against the action of spring 99, causing the lever 98 to rise against the action of spring 100,—the amount of rise being in proportion to the pressure. Affixed to the free end of the lever is the frame or support 101 upon which are mounted four mercury switches each set at different inclinations with respect to the horizontal. In the preferred arrangement, the mercury switch tubes are pivotly mounted on the member 101 one above the other at successively greater inclinations, and are immovably held at such inclinations by adjustable means. Mercury switch 102 is first set at an inclination for a predetermined steam pressure, for example one pound; and the other switches 103, 104 and 105 are set at successively greater inclinations, for successively greater pressure, say two, three and four pounds, respectively.

By referring to Figure 8 it will be noted that the support 101 contains at the bottom thereof a fixed arm 106. Each of the mercury tubes is supported by a suitable bracket containing an arm fixed with respect to the tube. For example, the tubes 102, 103, 104 and 105 are operatively associated with arms 107, 108, 109 and 110, respectively. Each of the said arms contains therein a threaded hole 111 with which an adjusting bolt 112 is in threaded engagement. Each of said bolts is in abuttable engagement with the next lower arm. It is thus apparent that when tube 102 is set at a predetermined position, the other tubes can be set at predetermined inclinations with respect to tube 102 by operatively manipulating the adjusting bolt 112.

Each of the mercury tubes is electrically connected in a circuit containing the secondary 95 of the transformer 94 and the solenoid 20—certain of the tubes being also electrically connected to certain of the thermometer switches located outside of the building. The first of the mercury switches 102 is connected through line 113 to the second thermometer switch 48; the mercury switch 103 is connected to the third thermometer switch 49; the third mercury switch 104 is connected to the fourth thermometer switch 50; and the fourth mercury switch 105 is not connected with any of the thermometer switches, but is connected through line 114 directly to the solenoid 20. It will be observed that the first thermometer switch 47 is not connected with any of the aforesaid mercury switches in the manner of the other corresponding switches.

The said thermometer switches 47, 48, 49 and 50 are connected with the solenoid 20 and the mercury switches operatively associated with the drum 25 in the manner shown in Figure 1, and hence will not be again described.

Let us assume that the temperature settings of the terminals at the thermometer switches are similar to those of Figure 1—terminal 52 being set at 56° Fahr., terminal 54 at 48° Fahr., terminal 56 at 33° Fahr., and terminal 50 at 20° Fahr. If the outside temperature is at 53° Fahr., the circuit at thermometer 47 will be broken. When the pressure in the boiler reaches one pound, the movement of lever 98 will cause mercury switch 102 to move to its closed position, the other mercury tubes being still in their open position as indicated in Figures 7 and 8. Upon a closing of said mercury switch 102, the circuit through line 113 and thermometer switch 48 will be closed, thereby energizing the solenoid and breaking the circuit at burner terminals 14 and 15. As long as the outside temperature does not fall as low as 48° Fahr., the heating system will be provided with one pound pressure for a period of at least five minutes during a two hour period (or for any other interval in accordance with the design of the drum 25).

If the temperature should now fall to 45° Fahr., the circuit at thermometer 48 will be broken. The pressure will then be built up to two pounds, at which point tube 103 will have been swung to its closed position. When this occurs, the circuit will be closed through line 115 and mercury switch 49, thereby energizing the solenoid and discontinuing the burner operation. The action of drum 25 in conjunction with the circuits associated therewith will assure a maintenance of this pressure for a predetermined time, in accordance with the system above described. If the temperature then drops to 30° Fahr., mercury switch 104 will be actuated to its closed position, to close the circuit through line 116 and thermometer switch 50, and actuate the solenoid 20 in the manner aforesaid. And the pressure will be maintained at three pounds for a predetermined period in accordance with the design of drum 25. And when the pressure within the boiler should attain four pounds, mercury switch 105 will be actuated to close the circuit through line 114 and the solenoid 20—thereby discontinuing the operation of the burner. The design of the control drum 25 will assure the maintenance of the pressure at four pounds for a predetermined period during a complete revolution of the drum.

It will be observed that the introduction of unit 96 in the system containing the thermo-electric outside control switches, the drum 25 arrangement and the mercury tubes 31, 32, 33, 34 and 35, has been effectuated without in any way affecting or interfering with the control of the burner according to the structure of Figure 1. The arrangement is such that not only will outside temperature conditions control the number and duration of "on" and "off" periods of the burner, but also the amount of pressure supplied to the heating system.

It will be further observed that the unit 96 readily permits of adjustments for predetermined minimum pressures with either fixed or variable pressure differentials between the successive mercury tubes therein. For example, the inclinations of the tubes may be so set as to produce equal pressures therebetween, such as one pound. If, then, the first tube 102 is set, at different times, for different minimum pressures, no adjustments are made on the other tubes if the pressure differential is to remain one pound. Only the lowermost bolt 112 abutting arm 106 need be adjustably manipulated, and all the tubes will be uniformly actuated through equal pressure ranges. But should it be desired to alter the pressure differential between the tubes, that could be readily effected by individually manipulating any or all of the other adjusting bolts 112.

My invention has been herein described in connection with a steam heating system operated by a motor driven oil burner, and controlled by pressure-sensitive means such as the pressure switch 22 or the pressure-actuated member 97 in unit 96. It is, however, understood that it can be applied to other control systems other than the types specifically hereinabove described. For example, instead of the pressure-sensitive devices 22 and 97, heat-sensitive control devices may be employed, such as heat control in the return line of a conventional hot water heating system. And instead of burning oil, other fuels may be employed, such as gas for example. With the use of gas, the switch member 16 would be replaced by a valve for starting and stopping the fuel supply, or by any other movable member or control means suitable for the purpose.

It is of course understood that other additional forms and modifications of the apparatus and adaptation of the method constituting this invention can be employed beyond and in addition to those hereinbefore described, all within the scope of the appended claims.

What I claim is:

1. In a control mechanism for intermittently operating a fuel supply device in a heating system, a main circuit through which said fuel supply device is controlled, movable control means for starting and stopping said fuel supply device, a solenoid operatively connected with said control means and adapted when energized to hold said control means in its inoperative position for stopping the fuel supply device, a control circuit through which said solenoid is controlled, means for normally holding said control means in its operative position, a plurality of normally open control switches, a plurality of temperature responsive switch members set for different predetermined temperatures each being electrically connected through said control circuit to a corresponding one of said control switches and the said solenoid, and rotatable actuating means for intermittently closing said control switches comprising a rotatably mounted member containing groups of spaced switch-actuating means each group being operatively associated with a corresponding one of said control switches, the said switch-actuating means being spaced in predetermined staggered relation so as to actuate the coacting switches one at a time and a predetermined number of times during each revolution, whereby the frequency of de-energizing of the solenoid and the consequent release of the said movable control means to start the fuel supply device will depend upon the number of temperature responsive switch members in circuit-breaking condition.

2. In a control mechanism for intermittently operating a fuel supply device in a boiler heating system, a main circuit through which said fuel supply device is controlled, movable control means for starting and stopping said fuel supply device, a solenoid operatively connected with said control means and adapted when energized to hold said control means in its inoperative position for stopping the fuel supply device, a control circuit through which said solenoid is controlled, means for normally holding said control means in its operative position, a plurality of normally open control switches, a plurality of temperature responsive switch members set for different predetermined temperatures each being electrically connected through said control circuit to a corresponding one of said control switches and the said solenoid, rotatable actuating means for intermittently closing said control switches comprising a rotatably mounted member containing groups of spaced switch-actuating means each group being operatively associated with a corresponding one of said control switches, the said switch-actuating means being spaced in predetermined staggered relation so as to actuate the coacting switches one at a time and a predetermined number of times during each revolution, and a boiler control switch electrically connected through said control circuit to the solenoid and adapted to break the circuit therethrough under predetermined boiler conditions.

3. In a control mechanism for regulating a boiler heating system, a fuel supply device, a main circuit through which said fuel supply device is controlled, movable control means for starting and stopping said fuel supply device, electro-mechanical means operatively associated with said movable control means, a control circuit through which said electro-mechanical means are controlled, a plurality of normally open control switches, a plurality of circuit-breaking members each being electrically connected through said control circuit to a corresponding one of said control switches and said electro-mechanical means, means to actuate each of said control switches into its closed position a predetermined number of times during a given interval, whereby the circuit through any actuated control switch and the electro-mechanical means will be completed and said movable control means operatively actuated thereby when the corresponding circuit-breaking member is in its closed condition, and boiler control means comprising a lever movable under the influence of predetermined boiler conditions, the extent of movement being proportionate to the magnitude of said boiler conditions, a plurality of mercury tube switches mounted on said lever at various predetermined inclinations whereby each switch will be actuated to its closed condition at a predetermined position of the lever, there being one of said mercury tube switches to correspond with each of said circuit-breaking members, each of said mercury tube switches being electrically connected through said control circuit to said electro-mechanical means and one of the non-corresponding circuit-breaking members.

4. In a control mechanism for regulating a boiler heating system, a fuel supply device, a main circuit through which said fuel supply device is controlled, movable control means for starting and stopping said fuel supply device, a solenoid operatively connected with said control means, a control circuit through which said solenoid is controlled, said solenoid being adapted when energized to hold said control means in its inoperative position for stopping the fuel supply device, means for normally holding said control means in its operative position, a plurality of normally open control switches, a plurality of temperature responsive switch members set for different predetermined temperatures each being electrically connected through said control circuit to a corresponding one of said control switches and the said solenoid, rotatable actuating means for intermittently closing said control switches comprising a rotatably mounted member containing groups of spaced switch-actuating means each group being operatively associated with a corresponding one of said control switches, the said switch-actuating means being spaced in predetermined staggered relation so as to actuate the coacting switches one at a time and a predetermined number of times during each revolution, and boiler control means comprising a lever movable under the influence of predetermined boiler conditions, the extent of movement being proportionate to the magnitude of said boiler conditions, a plurality of mercury tube switches mounted on said lever at various predetermined inclinations whereby each switch will be actuated to its closed condition at a predetermined position of the lever, there being one of said mercury tube switches to correspond with each of said temperature responsive switch members, each of said mercury tube switches being electrically connected through said control circuit to said solenoid and one of the non-corresponding temperature responsive switch members.

5. In a control mechanism for regulating a steam heating system, a fuel supply device, a main circuit through which said fuel supply device is controlled, movable control means for starting and stopping said fuel supply device, a solenoid operatively connected with said control means, a control circuit through which said solenoid is controlled, said solenoid being adapted when energized to hold said control means in its inoperative position for stopping the fuel supply device, means for normally holding said control means in its operative position, a plurality of normally open control switches, a plurality of temperature responsive switch members set for different predetermined temperatures each being electrically connected through said control circuit to a corresponding one of said control switches and the said solenoid, rotatable actuating means for intermittently closing said control switches comprising a rotatably mounted member containing groups of spaced switch-actuating means each group being operatively associated with a corresponding one of said control switches, the said switch-actuating means being spaced in predetermined staggered relation so as to actuate the coacting switches one at a time and a predetermined number of times during each revolution, and boiler control means comprising a pressure-sensitive member, a plurality of adjacent mercury tube switches operatively associated therewith, said mercury tube switches being set at various predetermined inclinations whereby each switch will be actuated to its closed condition at a predetermined condition of the pressure-sensitive member, there being one of said mercury tube switches to correspond with each of said temperature responsive members, each of said mercury tube switches being electrically connected through said control circuit to said solenoid and one of the non-corresponding temperature responsive switch members.

6. In a control mechanism for regulating a heating plant, a fuel supply device, a main circuit through which said fuel supply device is controlled, a movable switch member in series with said main circuit, a solenoid, a control circuit through which said solenoid is controlled, an armature operatively associated with said solenoid and carrying said switch member, a plurality of normally open control switches, a plurality of circuit-breaking members each being electrically connected through said control circuit to a corresponding one of said control switches and said solenoid, a rotatably mounted cylindrical drum, a motor for the drum, clutch means for releasably connecting said drum with said motor, said armature being connected with the clutch means whereby upon an operative actuation of the armature and switch member to open the said main circuit the clutch means will be actuated to connect the drum with said motor, groups of switch-actuating means associated with the drum, each group being operatively associated with a corresponding one of said control switches, the switch-actuating means in said groups being spaced in predetermined staggered relation so as to actuate the coacting switches one at a time and a predetermined number of times during each revolution of the drum, whereby the circuit through any actuated control switch and the solenoid will be completed and said armature and associated parts will be accordingly operatively actuated when the corresponding circuit-closing member is in its closed condition, a rotatable time clock dial operatively connected to said motor, switch means in series with said main electric circuit, and means associated with said dial for actuating said last-mentioned switch means at predetermined times.

7. In a control mechanism for intermittently actuating a fuel supply device, a solenoid, a main circuit through which said fuel supply device is connected including a burner control switch, a movable armature associated with said solenoid for operating said burner control switch, a rotatably mounted cylindrical drum, a motor for rotating said drum, clutch means for releasably connecting said drum with said motor and operatively connected to said armature whereby upon energization of said solenoid said armature will open said burner control switch, and actuate said clutch means to connect the drum with said motor, a plurality of normally open control switches, a plurality of groups of switch-actuating means on said drum, each group being operatively associated with a corresponding one of said control switches, said switch actuating means being so spaced as to actuate the corresponding switches a predetermined number of times during each revolution of the drum and to maintain one of said control switches closed at all times, a plurality of temperature responsive switches each adjusted to close at a different temperature and each being electrically connected in series with a corresponding one of said control switches and with said solenoid, whereby said solenoid will normally be deenergized only during the period of closure of any of said control switches which are in series with an open temperature responsive switch to thereby close the burner control switch and declutch the drum from said motor, and condition responsive means for subsequently energizing said solenoid to reengage said clutch means to cause continued rotation of said drum.

8. In a control mechanism for intermittently actuating a fuel supply device, a solenoid, a main circuit through which said fuel supply device is connected including a burner control switch, a movable armature associated with said solenoid for operating said burner control switch, a rotatably mounted cylindrical drum, a motor for rotating said drum, clutch means for releasably connecting said drum with said motor and operatively connected to said armature whereby upon energization of said solenoid said armature will open said burner control switch, and actuate said clutch means to connect the drum with said motor, a plurality of normally open control switches each containing a switch arm, said drum containing on the surface thereof a plurality of groups of spaced slots each group being operatively associated with a corresponding one of said control switches, the slots in said groups being in predetermined staggered relation so as to receive the corresponding switch arms one at a time and a corresponding number of times during each revolution of the drum and thereby cause the corresponding control switch to be actuated a predetermined number of times during each revolution, the slots in one of said groups being of such lengths as to extend circumferentially over those portions of the drum not containing circumferential projections of the other slots whereby one of said control switches will be maintained closed at all times, a plurality of temperature responsive switches each adjusted to close at a different temperature and each being electrically connected in series with a corresponding one of said control switches and with said solenoid, whereby said solenoid will normally be deenergized only during the period of closure of any of said control switches which are in series with an open temperature responsive switch to thereby close the burner control switch and declutch the drum from said motor, and condition responsive means for subsequently energizing said solenoid to reengage said clutch means to cause continued rotation of said drum.

ARTHUR NEWMAN.